No. 650,291. Patented May 22, 1900.
F. W. ZIMMERMAN.
CORN GRINDER.
(Application filed Sept. 14, 1899.)
(No Model.) 2 Sheets—Sheet 1.
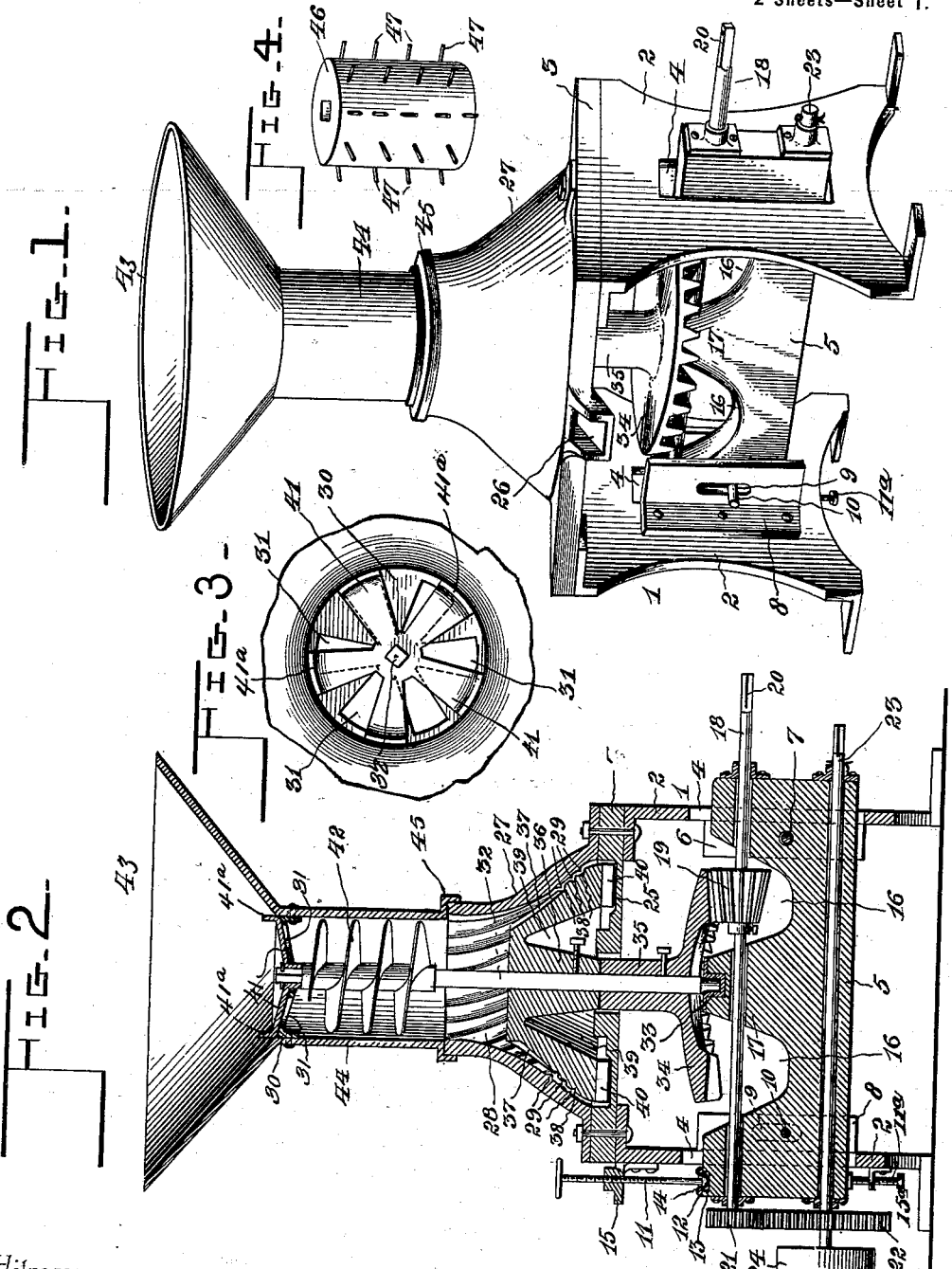
Witnesses
John F. Deufferwid
Chas. D. Hoyer.
F. W. Zimmerman, Inventor
By his Attorneys,
C. A. Snow & Co.

No. 650,291. Patented May 22, 1900.
F. W. ZIMMERMAN.
CORN GRINDER.
(Application filed Sept. 14, 1899.)
(No Model.) 2 Sheets—Sheet 2.
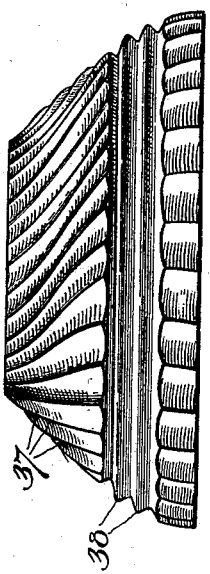
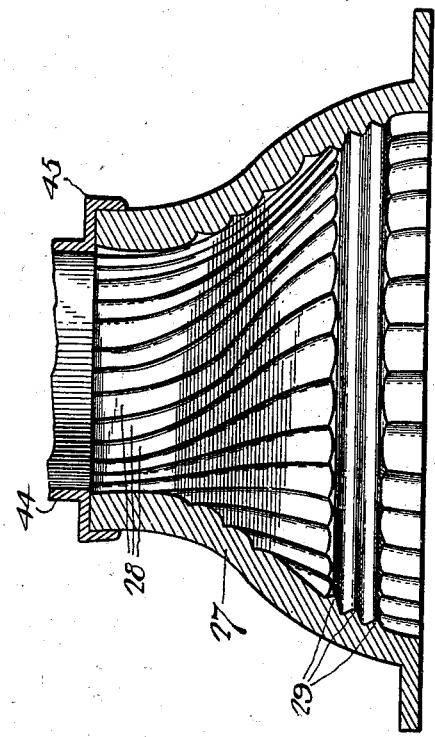

UNITED STATES PATENT OFFICE.

FRANK W. ZIMMERMAN, OF WASHBURN, TEXAS.

CORN-GRINDER.

SPECIFICATION forming part of Letters Patent No. 650,291, dated May 22, 1900.

Application filed September 14, 1899. Serial No. 730,514. (No model.)

*To all whom it may concern:*

Be it known that I, FRANK W. ZIMMERMAN, a citizen of the United States, residing at Washburn, in the county of Armstrong and State of Texas, have invented a new and useful Corn-Grinder, of which the following is a specification.

This invention relates to corn-grinders, and is particularly intended for use in grinding ordinary corn, Kafir corn, millet-seed, and other grain, and has for its object to provide a device of this character having an efficient and positive operation and including adjustable devices for regulating the degree of fineness and wherein the corn or other material is first fed to a series of cutters, one of which acts at a time to reduce the power of driving the entire device, and whereby the grinding mechanism receives the corn or other material in a cut or broken state and facilitates the grinding operation.

Other objects and advantages will appear in the subjoined description and the novelty pointed out in the appended claims, the preferred embodiment of the improvement being illustrated in the accompanying drawings, wherein—

Figure 1 is a perspective view of a grinder embodying the invention. Fig. 2 is a longitudinal vertical section of the same. Fig. 3 is a top plan view of a part of the device. Fig. 4 is a detail view of a different form of feeder. Fig. 5 is an enlarged transverse sectional view of the shell and a portion of the neck above the same. Fig. 6 is an elevation of the cone on an enlarged scale.

Similar numerals of reference are employed to indicate corresponding parts in the several views.

The numeral 1 designates a supporting-frame comprising opposite legs 2, adapted to be suitably fastened to a base-rest and having secured on the upper extremities thereof a horizontal bed-plate 3. Each of the legs 2 has a central slot 4 therein, which is vertically disposed as to its length, and adjustably mounted therein is a bearing-support 5, the opposite extremities of said support projecting through the slots 4. On the inner side of one of the legs 2, adjacent the opposite side walls of the slot 4, fulcrum-guides 6 are fastened, and therein is mounted a pivot-rod 7, which extends transversely through the part of the bearing-support 5 extending between the said guides. On the other leg 2, adjacent one side of the slot 4, angle-plates 8 are fastened and also applied to the inner side of the said leg. The member of each of said angle-plates which stands free and in a plane parallel with the bearing-support 5 has an elongated slot 9 formed therein to receive a pin 10, laterally projecting from the bearing-support and serving to guide the said support in its adjustment. To the extremity of the support 5, which is movable in the leg 2, carrying the angle-irons 8, an adjusting-screw 11 is loosely attached by having a head 12 on the lower end thereof held in a recess 13 in the top portion of said extremity by means of a holding-plate 14, the upper part of the said screw working in a bracket 15, attached to the adjacent end of the bed-plate or otherwise fixed in immovable position. The bearing-support 5 has recesses 16 in the upper portion thereof to provide a central upstanding projection 17 and also to afford means for conveniently applying the operative mechanism. An adjusting-screw 11$^a$ on the leg 2 also has bearing against the under edge of the projected end of the support 5 and serves to assist the screw 11 in securing the adjustment of said support.

A shaft 18 extends longitudinally through the upper part of the bearing-support and is fitted in the opposite extremities of the same as well as the central upstanding projection 17, thus leaving a portion of the said shaft clear where it crosses the recesses 16. On this shaft and movable in one of the recesses is a beveled pinion 19, which is keyed fast or fastened in such a manner that a quick detachment thereof may be obtained when it is desired to withdraw the shaft and also providing means for a convenient assemblage of the said parts. Both ends of the shaft 18 are projected beyond the opposite extremities of the bearing-support, and one end is squared, as at 20, for a purpose which will be presently explained, and on the opposite end is fastened a pinion 21. The pinion 21 meshes with a spur-gear on a lower drive-shaft 23, also extending longitudinally through the bearing-support 5 and supplied with a band-pulley or analogous device 24 on one extremity and having the opposite extremity extended and squared and adapted to receive a tumbling-shaft of a horse-power.

The bed-plate 3 is formed with a circular discharge-groove 25 in its upper side, which leads to a side discharge-spout 26, and firmly bolted on the said bed-plate is a shell 27, having spiral teeth 28, formed on the inner surface thereof, running from the upper edge downwardly toward the bottom of the same. The said shell near its lower portion is also formed with a series of inwardly-projecting ribs 29, which are circumferentially arranged. A feed-cap 30 is snugly fitted in the hopper at the upper terminal of the neck 44 and has a regular central depression and formed with radial openings 31, as clearly shown by Fig. 3. The upper end of the shaft 32 is fitted in the center of this feed-cap and extends vertically through the machine, being angular and having its lower end stepped or fitted in a bearing-socket 33 in the top of the upstanding projection 17. On the lower portion of the said shaft 32 a crown-gear 34 is fastened, which meshes with the pinion 19, the sleeve 35 of said gear extending upwardly on the said shaft, and thereagainst is placed a grinding-cone 36, relatively fitted in the shell 27 and having spiral teeth or grooves 37, which have a reverse direction to the teeth 28 of said shell, and at its lower portion said cone is formed with a series of circumferential grooves 38, which are disposed opposite the ribs 29 of the shell. The cone 36 is of the form shown, by preference, and has an annular space 39 opening out through the bottom and widest at the latter point. The purpose of this annular space is to clear the discharge-groove 25 as much as possible and prevent choking of the same, and depending into the said groove from the bottom of the cone are lugs 40, which act to push the ground material around toward the discharge-spout 26. On the shaft 32 in the base of the hopper a knife-wheel 41 is secured, and consists of a series of five radially-extending blades closely bearing against the upper side of feed-cap 30 and shaped similarly to the latter. The blades of the cutting-wheel are to be one less in number than the feed-openings of the said cap 30, and all of the said feed-openings will be closed except one. The blades of the cutting-wheel are also sharpened at one edge and coact with the edge walls of the feed-openings, and further provided with upstanding terminals 41ᵃ to serve as agitating means. By having the feed regulated in this manner less power will be required to drive the mechanism, with the additional advantage that the corn or other grain or material will be broken or cut before falling into the shell 27. On the upper extremity of the shaft 32 is a feed-screw or auger 42, mounted below the cap 30, and over the said screw is placed a hopper 43, having a neck 44, to which said cap is secured, and provided with a lower flanged end 45, that bears on the upper edge of the shell. The hopper is removably applied through its neck by any suitable means, and the feed-screw 42 works in said neck to force the cut or broken corn, grain, or other material down to the grinding devices, and thereby insure a uniform feed at all times. The screw 42 is intended to be used with shelled corn or loose grain, and to make the grinder equally effectual in operating on unshelled corn a breaker 46, as shown by Fig. 4, is substituted for the screw 42, the said breaker having outwardly-projecting pins 47, which crush the cobs or break them sufficiently for effectual grinding.

In the operation of the improved grinder the corn or other material is fed into the shell 27 through the cap 30, being first cut or broken by the knife-wheel 41, as before set forth. After falling into the shell the corn or grain is caught and ground in the space between said shell and the cone 36, and the ground material is finally deposited in the discharge-groove 25, and from thence pushed to the discharge-spout 26 by the lugs 40. The degree of fineness of grinding can be regulated by shifting the screw 11 in opposite directions to raise or lower the end of the bearing-support to which it is connected and simultaneously move all the gearing and shafts in a similar direction and dispose the cone closer to or at a greater distance from the shell. The grooves 38 and ribs 29, respectively, on the cone and shell operate to break up and grind stems that may come through with certain kinds of corn or grain and pulverize the same in meal form with material benefit. The gearing has a preferred time relation, the spur-gear 22 being much larger than the pinion 21, and consequently the shaft 18 will be driven at a high rate of speed. At times it may be desired to run at a slow speed, and to arrange the device for such change of speed the pulley 24 is removed from the shaft 23 and fitted on the squared end 20 of the said shaft 18, the latter shaft then directly receiving the applied driving power. The feed-screw 42 is also very convenient for use in feeding Kafir corn, which is apt to pack very tightly and under ordinary circumstances interfere with a regular feed. The agitation of the screw will avoid any such tendency.

While it is preferred that the grinder be used for feeding corn and grain of various kinds, it is obvious that it might be also conveniently employed in pulverizing ores, and in such use the cutting-wheel 41 would be removed and the feed regulated accordingly. This change would not involve any departure from the invention, as it would consist only in depleting the device, as shown, of a portion of its parts. One of the very important features of the present form of grinder is the adjustable means for the cone, which simultaneously shifts all the gearing and shafts without requiring an individual adjustment of the latter or disturbing their movement. The shell 27 can be detached at any time and the cone removed from the bed-plate for cleaning purposes or other manipulation, and changes in the proportions, size, and minor details of construction may be resorted to without departing from the spirit or sacrificing any of the advantages of the invention.

Having thus described the invention, what is claimed as new is—

1. In a device of the character set forth, the combination of a grooved bed-plate having an outflow-spout at one side, a fixed shell mounted thereon, a rotatable cone vertically adjustable within the shell and having a portion extending into the grooved bed-plate, a vertical shaft extending through the cone projecting above and below the same, a bearing-support for the lower extremity of the shaft below the bed-plate, in a plane at a right angle to the said vertical shaft, driving mechanism for the said cone-shaft carried by said bearing-support, and a horizontally-disposed face-gear fixed on the lower extremity of said shaft above the driving mechanism and meshing with the latter.

2. In a device of the character set forth, the combination of a bed-plate, a vertically-disposed stationary shell thereon, a feed-cap mounted above the shell and having openings therein, a rotatable cone vertically adjustable within the shell, a shaft fixed to and extending through the said cone upwardly to the feed-cap, a knife-wheel on the shaft adjacent to the feed-cap, a feeding device below the said cap and knife-wheel between the latter and the upper extremities of the cone and fixed to and rotatable with the shaft and surrounded by an inclosure between the upper edge of the shell and the said cap, and mechanism for driving the said shaft to simultaneously rotate the cone and knife-wheel carried thereby.

3. In a device of the character set forth, the combination of a bed-plate having a discharge-groove therein leading to a discharge-spout, a shell fixed in upright position on the said bed-plate, a vertically-adjustable cone rotatably mounted within the shell and having lugs depending into the said discharge-groove, a cap located above the upper extremity of the cone, and an inclosing neck resting on the cone and supporting the said cap, means for feeding the material to be ground to the cone and shell fixed to the rotating means for the cone and located between the latter and the cap, supporting-legs for the bed-plate having openings therethrough, a bearing-support in a plane at a right angle to the plane of adjustment of the cone, and having its opposite extremities adjustably mounted in the said openings of the legs and projected beyond the plane of the latter and extending completely under the bed-plate below the latter, a shaft having its lower end mounted on the bearing-support and extending upwardly through the cone and shell, a gear fixed to said shaft below the cone, and driving mechanism including upper and lower horizontally-disposed shafts, extending in the same direction as and rotatably carried by the said bearing-support for operating the said gear.

4. In a device of the character set forth, the combination of a bed-plate, a frusto-conical shell fixed thereon and having spiral teeth extending downwardly thereover and also provided with a series of ribs circumferentially arranged on the lower enlarged portion thereof, a cone rotatably mounted in the shell and having spiral teeth arranged reversely to the teeth of the shell and also provided with a series of lower circumferential grooves coacting with the ribs of the shell, means for feeding the material to be ground to the shell and cone, and mechanism for operating and adjusting the said cone within the shell.

5. In the device of the character set forth, the combination of opposite end legs having slots therein, a bed-plate on the said legs having a discharge-groove therein leading to a discharge-spout, a shell of frusto-conical form fixed on the said bed-plate and open at both ends, a vertically-adjustable cone rotatably mounted within the shell and having lugs depending into the discharge-groove, a vertically-disposed shaft extending through the cone above and below the shell and having feeding means on its upper portion above the shell, a gear fast on the lower portion of the shaft having teeth on its lower face, a bearing-support extending under the bed-plate through the slots in the legs in a plane at right angles to the said shaft and supporting the lower extremity of the latter, the slots in the leg being longer than the vertical extent of the bearing-support, and the said bearing-support vertically adjustable therein, a horizontally-disposed shaft mounted in the upper part of the bearing-support and extending longitudinally therethrough and having a pinion thereon meshing with the gear on the vertical shaft, a drive-shaft also extending through the bearing-support in a plane parallel with and below the shaft above and having a gear connection with the upper shaft in the bearing-support, and means for adjusting the said bearing-support.

In testimony that I claim the foregoing as my own I have hereto affixed my signature in the presence of two witnesses.

FRANK W. ZIMMERMAN.

Witnesses:
C. G. LANDIS,
W. H. TAYLOR.